(12) United States Patent
Varnier et al.

(10) Patent No.: US 12,365,336 B2
(45) Date of Patent: Jul. 22, 2025

(54) METHOD AND DEVICE FOR ASSISTING WITH THE LATERAL POSITIONING OF A VEHICLE

(71) Applicant: PSA AUTOMOBILES SA, Poissy (FR)

(72) Inventors: Matthieu Varnier, La Verriere (FR); David Giraud, Chatenay Malabry (FR); Zoubida Lahlou, Lissasfa Casablanca (MA)

(*) Notice: Subject to any disclaimer, the term of this patent is extended or adjusted under 35 U.S.C. 154(b) by 215 days.

(21) Appl. No.: 18/022,690

(22) PCT Filed: Jul. 29, 2021

(86) PCT No.: PCT/FR2021/051420
§ 371 (c)(1),
(2) Date: Feb. 22, 2023

(87) PCT Pub. No.: WO2022/053750
PCT Pub. Date: Mar. 17, 2022

(65) Prior Publication Data
US 2023/0356715 A1 Nov. 9, 2023

(30) Foreign Application Priority Data
Sep. 10, 2020 (FR) .................. 2009154

(51) Int. Cl.
*B60W 30/12* (2020.01)
*B60W 40/105* (2012.01)
*B60W 30/18* (2012.01)

(52) U.S. Cl.
CPC .......... *B60W 30/12* (2013.01); *B60W 40/105* (2013.01); *B60W 30/18163* (2013.01); *B60W 2510/202* (2013.01); *B60W 2520/10* (2013.01); *B60W 2520/30* (2013.01); *B60W 2540/18* (2013.01); *B60W 2540/20* (2013.01);
(Continued)

(58) Field of Classification Search
CPC ................. B60W 30/10; B60W 30/12; B60W 2520/202; B60W 2520/10; B60W 2540/18; B60W 2540/20; B60W 2552/00; B60W 2552/05; B60W 2552/10; B60W 2552/53; B60K 28/00–165; B62D 15/025; G05D 1/0061; G05D 1/0088; G05D 1/021; G05D 1/0214; G05D 1/0221; G05D 1/0223
See application file for complete search history.

(56) References Cited

U.S. PATENT DOCUMENTS

2019/0176831 A1   6/2019   Moon et al.

FOREIGN PATENT DOCUMENTS

FR           3069222 A1     1/2019

OTHER PUBLICATIONS

International Search Report for PCT/FR2021/051420 mailed Nov. 11, 2021.
Written Opinion for PCT/FR2021/051420 mailed Nov. 11, 2021.

*Primary Examiner* — Mark L. Greene
(74) *Attorney, Agent, or Firm* — Sandberg Phoenix & von Gontard P.C.

(57) ABSTRACT

A method and a device are disclosed for assisting with the lateral positioning of a vehicle, said vehicle being able to be driven by a driver in an automated manner along a reference path in a traffic lane, said traffic lane being bounded by two edges. The method comprises steps of detecting an upcoming split in the traffic lane, determining a widened area in the traffic lane, and determining a plurality of reference paths.

12 Claims, 4 Drawing Sheets

(52) U.S. Cl.
CPC ..... *B60W 2552/10* (2020.02); *B60W 2552/53* (2020.02); *B60W 2554/4042* (2020.02)

METHOD AND DEVICE FOR ASSISTING WITH THE LATERAL POSITIONING OF A VEHICLE

CROSS-REFERENCE TO RELATED APPLICATIONS

This application is the U.S. National Stage under 35 USC § 371 of International Application No. PCT/FR2021/051420, filed 29 Jul. 2021 which claims the priority of French application 2009154 filed on 10 Sep. 2020, the content (text, drawings and claims) of both said applications being incorporated here by reference.

BACKGROUND

Disclosed herein are a method and a device for assisting with the lateral positioning of a vehicle.

More particularly, said vehicle is able to be driven by a driver in an automated manner along a reference path in a traffic lane, said traffic lane being bounded laterally by two edges, a right edge and left edge. The edges may be markings on the ground, sometimes called boundary lines. Also, the edges are recognizable, for example, using image processing that identifies a change in material, color and/or texture of the ground.

The longitudinal demarcation of a traffic lane is bounded by a distance between two points, between two transverse axes, between a distance between the beginning and the end of the lane. An area, region, or portion of a traffic lane is represented by the surface of the traffic lane bounded laterally and longitudinally.

A traffic lane may, at a given location, split into two or more lanes. This multiplication of the lanes can allow a vehicle, traveling in said traffic lane, to pass another vehicle in front of it or to position itself on the most suitable side relative to the traffic or relative to the trajectory desired by the driver of the vehicle.

The widened area of a traffic lane is bounded longitudinally by the region where the width of the lane increases. It begins where the width of the lane begins to increase, therefore after an initial lane, and it ends where a marking indicates the splitting of the lanes created by the widening of the initial lane.

Vehicles, particularly automobile vehicles, travel in these lanes. Certain vehicles, operated by a driver, are able to be driven in an automated manner along a reference path. They comprise a lateral positioning aid device with respect to the lateral borders of the traffic lane taken. This device comprises devices capable of perceiving the environment (i.e., camera, RADAR, LIDAR and other rangefinders), and in particular the edge of the lane over a given horizon or a given distance.

It is known that these said vehicles are able to detect the beginning of a widened area by monitoring the lateral distance between the two edges of the lane. Due to the limit of the perception of the environment over a distance provided by the devices capable of environmental perception, the determination of the end of the widened area as soon as the detection of the beginning of said widened area is not possible if the marking, which marks the splitting of the lanes created by the widening of the initial lane, is not detected by said members. It is known that the determination of the end of the widened area is carried out during the travel of said vehicle in the widened area, for example, until a new marking is detected which marks the splitting of the lanes created by the widening of the initial lane.

Certain lateral positioning aid devices take as a reference path the median to the edges of the traffic lane. When this occurs, the vehicle will be incorrectly positioned at the end of the widened area of the traffic lane. It will be placed between the two new lanes, therefore at the splitting marking which will be created between these two lanes. The driver thus will have to resume manual operation and perform a late lateral movement with a risk of colliding with another passing vehicle.

Other lateral positioning aid devices take as a reference path a fixed distance relative to one edge of the traffic lane. However, the selected trajectory may not be the trajectory desired by the driver. The choice of the final travel lane by the lateral positioning aid device, at the end of the widening and the splitting into at least two lanes, will be seen as arbitrary from the point of view of the driver. If appropriate, he will then have to suspend the assistance in the widened area in order to resume driving manually, then reactivate the assistance after the end of the widened area.

Furthermore, said devices do not make it possible to take into account several reference paths in the widened area.

SUMMARY

An object is to improve comfort, relevance (intuitive nature), and safety of driving assistance devices.

To this end, we propose more specifically a method for assisting with the lateral positioning of a vehicle, said vehicle being able to be driven by a driver in an automated manner along a reference path in a traffic lane, said traffic lane being bound by two edges, said method comprising the steps of:
  detecting an upcoming split of said traffic lane into at least two new lanes;
  determining a widened area of said traffic lane;
  determining, in said widened area, reference paths capable of reaching each new lane;
  determining a first and a second sub-area of said widened area as a function of the reference paths and edges;
  wherein, when the vehicle is in the first sub-area, the method further comprises a step of selecting a first reference path from the determined reference paths, the selection being made from information acquired by at least one sensor of said vehicle; and wherein, when the vehicle is in the second sub-area, the method further comprises a step of selecting a second reference path from the determined reference paths, the selection being made only from at least one action on the steering wheel by the driver.

Thus, several reference paths are determined. Depending on the selected reference path, the vehicle is, autonomously, able to reach each new path after the widened area. However, the closer the vehicle is to the end of the widened area, the greater the change in reference path, and therefore a change in the trajectory of the vehicle will be dangerous (risk of collision with another vehicle for example).

It is then necessary to partition, i.e., demarcate, the widened area into two sub-areas. This partitioning into sub-areas is notably a function of the lateral distance, i.e., the lateral variance, between the reference paths and between the edges of the lane. This partitioning is then systematic and robust for the different forms (curvature, length, width) of the widened area.

Conceptually, the first sub-area represents a region where the lateral distance between the reference paths is relatively small. This distance varies from zero to approximately a half-lane width and may go almost to the width of a lane, while the second sub-area represents a region where the lateral distance between the reference paths becomes increasingly large.

Thus, in the first sub-area, where the lateral distance between the reference paths is close, it is possible to adapt driving aids, such as the lateral positioning, as a function of the perceived environment without compromising the comfort or safety felt by the driver and/or the passengers. The vehicle will be able to change lanes automatically without any substantial action of the driver on the steering wheel (i.e., a variation in rotation of the steering wheel or the steering wheel torque greater than a predetermined threshold).

In the first sub-area, the width of the path remains sufficiently small to avoid being passed by another vehicle. Thus, there is only very little risk of collision during the automatic lateral positioning modification. It is not useful for the vehicle to be over-equipped with additional sensors to measure and analyze in real time what happens behind the vehicle.

On the other hand, if the vehicle is in the second sub-area, the adaptation of driving aids, such as the lateral positioning, must only be done through an action of the driver (and not simply as a constraint of the environment). The driver than takes the responsibility of the change in trajectory, in particular against the increased risk of collision. This change in reference trajectory, through the action of the driver and by the driver, is then easily understandable because it is initiated by the user—thus avoiding a feeling of insecurity.

This method for selecting the reference path offers the best compromise between the cost and complexity of the environment perception devices to be provided, and offers positive effects on comfort and safety.

Advantageously, information acquired by at least one sensor of said vehicle is the side, left or right, of the activation of the turn signal.

It is a simple means for the driver to indicate, in the first sub-area, wherein the lane, ego-lane or adjacent lane, he wishes the vehicle to be at the end of the widened area (therefore the beginning of the downstream area). The driver therefore removes the uncertainty in the selection of the reference path without action on the steering wheel (variation of the angle of rotation of the steering wheel and/or of the torque on the steering wheel below a predetermined threshold).

Advantageously, information acquired by at least one sensor of said vehicle is the detection of another vehicle in front of and traveling more slowly than said vehicle.

The speed of a vehicle can be controlled in an automated manner relative to a set speed. In the upstream area of the widened area, the vehicle can be regulated at a speed lower than the set speed due to the detection of a vehicle in front traveling more slowly. The arrival in a widened area then allows a slower vehicle to be passed. When the vehicle is in the widened area, the method may choose the reference path enabling the preceding vehicle to be passed in a relaxed (smooth transition) and safe manner.

Advantageously, information acquired by at least one sensor of said vehicle is a speed of said vehicle that is less than or greater than a set speed.

The set speed in the upstream area can be different from the set speed in the downstream area of the widened area. Depending on the variance in the speed of the vehicle and the speed setpoints, the selection of the reference path is different: for example, selecting the reference path of the ego-lane if the setpoint speed in the downstream area is lower than the speed of the vehicle (for example arrival at a toll gate on a freeway), and selecting the reference path of the adjacent lane if the setpoint speed in the upstream area is higher than the vehicle speed (for example acceleration lane in order to be able to pass).

Advantageously, information acquired by at least one sensor of said vehicle is the lateral position of said vehicle in the widened area of said traffic lane.

In the first sub-area, the driver can slightly rotate the steering wheel (variation of the rotation angle of the steering wheel and/or the torque on the steering wheel less than a predetermined threshold) in order to place the vehicle on the right or left side, or even simply to be slightly resistant (torque) to the automatic rotation of the steering wheel accompanying the automatic choice of one path or the other. At the end of the first area, depending on the current lateral position, the method will select the closest reference path relative to a coordinate of the vehicle (for example, the center of gravity, the center of the rear axle, etc.). The vehicle will then be taken to the beginning of the downstream area on the path indicated by the driver, by following in the second sub-area the corresponding reference path.

Advantageously, the action on the steering wheel by the driver is a rotation of the steering wheel and/or a rotational torque applied to the steering wheel.

When the vehicle is in the second sub-area, the adaptation of driving aids, such as lateral positioning, must only be done on an action of the driver. The driver may even be led to perform this change for safety reasons (limited capacity of the vehicle to perceive side obstacles in particular), the method then taking note of the closest reference path following its action (accompanying the decision, adaptation of the trajectory to the desire of the driver). This change in reference trajectory upon the action of the driver is then easily understood, thus avoiding a feeling of insecurity. The driver being in control of the trajectory assesses the risks of a lateral movement of the vehicle.

Advantageously, the method further comprises the steps of:
  calculating a longitudinal distance relative to the beginning of said widened area, said longitudinal distance being a function of the reference paths and the edges;
  determining a first sub-area of said widened area between the beginning of said widened area and said longitudinal distance, the determination of the second sub-area corresponding to the complement of said first sub-area relative to the widened area.

Thus, it is possible to demarcate (or partition) the widened area of the traffic lane precisely and repetitively into two distinct sub-areas—the splitting angle of the lane. This demarcation is carried out by the traveling vehicle and can be updated while the vehicle is in the widened area if new elements are detected or specified as the end of the widened area. Indeed, at the beginning of the widened area, the vehicle's environmental perception sensors may not perceive the end of the widened area with certainty. However, a horizon close to the vehicle is perceived and makes it possible to calculate the reference paths of the ego-lane and of the adjacent lane by advantageously using the distances from the edges of the traffic lane.

Also disclosed is a device for assisting with the lateral positioning of a vehicle, said device comprising a memory associated with at least one processor configured to implement the method described above.

Also disclosed is a vehicle that comprises the aid for the lateral positioning of a vehicle.

Lastly, a computer program is provided comprising instructions suitable for executing the steps of the method for assisting in lateral positioning of a vehicle when said program is executed by at least one processor.

BRIEF DESCRIPTION OF THE FIGURES

Other features and advantages of the claimed invention will become apparent from the description of the non-limiting embodiments of the claimed invention below, with reference to the appended figures, in which:

DETAILED DESCRIPTION

Figure 1:
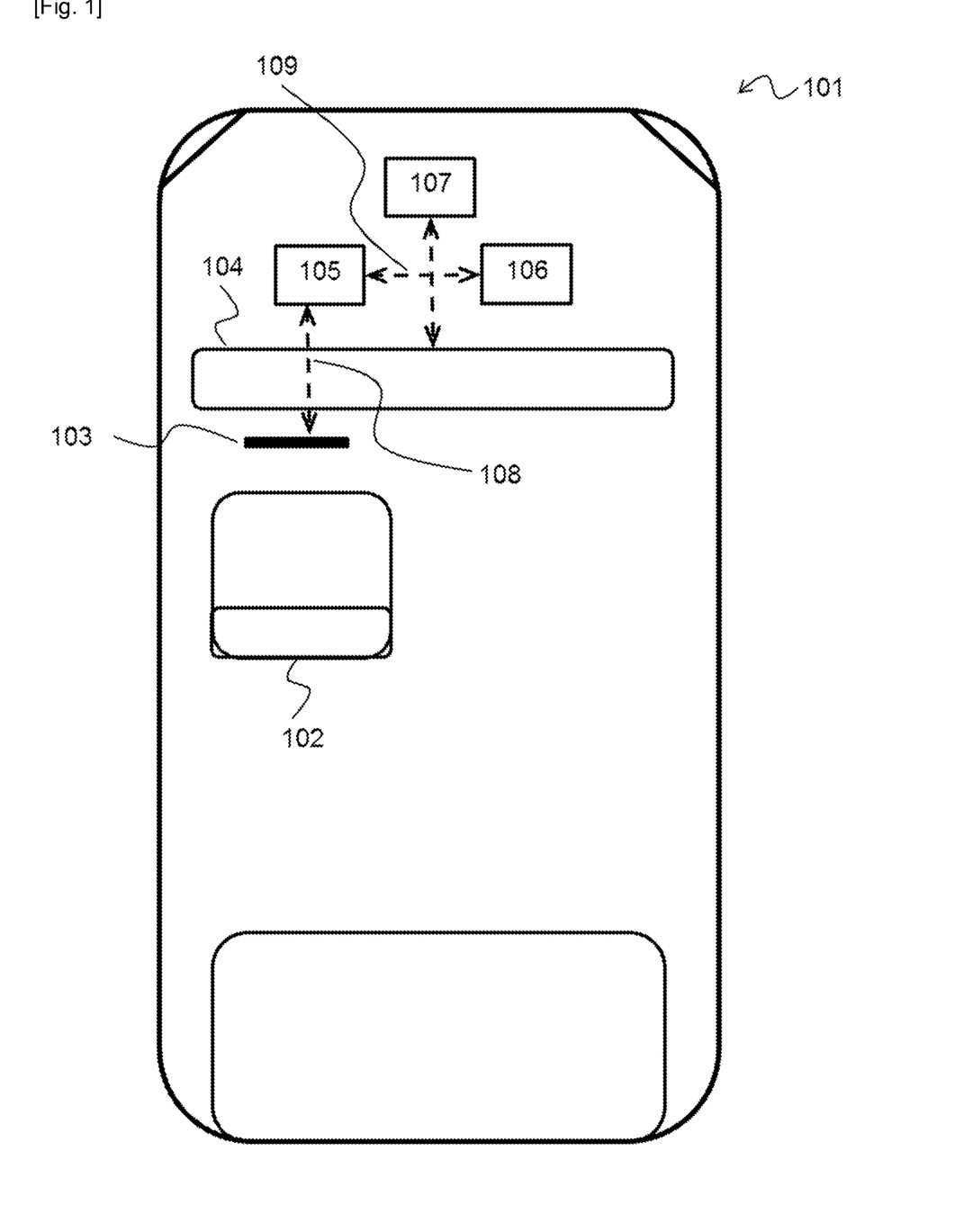
FIG. 1 schematically shows a vehicle.

FIG. 1 shows a vehicle 101 where a seat 102, a steering wheel 103, a dashboard 104 and a safety belt (not represented) constitute the driving position. According to one embodiment, the dashboard 104 comprises a cockpit, a multimedia system capable of displaying audio-visual information, a head-up display system and/or an air-conditioning/ventilation system. The passenger seats are not represented.

According to another embodiment, the steering wheel 103 and/or the dashboard 104 comprises at least one housing, a stalk switch which groups together different controls of a motor vehicle such as horn, turn signal lights, windshield wiper, high beams, low beams, position lights, activation/deactivation of driving aids such as speed regulator, lane position assistance, etc., adjustments and/or setting of driving aids, etc.

In one embodiment, the vehicle 101 comprises steering assistance devices 105 capable of measuring or estimating a steering wheel angle/speed/rotation/torque from an action on the steering wheel by the driver. These devices are also able to measure and/or estimate movements/speed/accelerations, linear or angular accelerations and/or to measure and/or estimate forces on the steering system (steering wheel, column, pinion, rack, tie-rod, joints, tires, etc.).

These devices 105 are also able to control steering assistance in order to be able to participate in a lateral positioning aid system.

In one embodiment, these devices 105 are of the Direction with Electronic Support type, of the hydraulic assistance type and/or of the "by-wire" type (There is no direct mechanical link between the steering wheel and the tires).

In one embodiment, the vehicle 101 comprises devices 106 able to drive the vehicle 101 in an automated manner along a reference path in a traffic lane. In particular, these devices 106 offer to the driver of the vehicle an aid in lateral positioning with respect to a reference path.

In one embodiment, these devices 106 comprise means for perceiving the environment of the vehicle. These means can process light waves (camera, laser, lidar, etc.), radio frequency waves (RADAR, Wifi, 4G, 5G, xG, etc.) and acoustic waves (ultrasound, etc.). These devices 106 are then able to communicate with the vehicle's exterior (with other vehicles, with connected objects such as a telephone, a computer, etc., with stations along the side of the road, with servers, etc.). In particular, these devices 106 can recognize a traffic lane, road edges and ground markings, objects (pedestrian, cyclist, automobile, truck, etc.) traveling in the vicinity or in the traffic lane around the vehicle;

In one embodiment, the vehicle 101 comprises at least one device 107, a computer for example, comprising a memory associated with at least one processor configured to implement the method.

In one embodiment, the device 107 automatically drives the vehicle 101 in a traffic lane according to a reference path. The device 107 comprises members for environmental perception, human-machine interfaces, and control of the vehicle 101.

The environment perception members are capable of:
  perceiving the outside or road environment using members such as RADAR, LIDAR, ultrasound, laser, image/video acquisition, or other rangefinders;
  perceiving the interior environment of the vehicle 101 using members such as position sensor, camera, driver and/or passengers monitoring devices.

The human-machine interface members are capable of:
  communicating with the driver and/or the passengers in order to inform the occupants of said vehicle 101, or to receive intentions or commands from the occupants of said vehicle 101;
  communicating with other vehicles, with the infrastructure, with people outside the vehicle 101 using so-called V2X communications based on wireless technologies such as WIFI, 4G, 5G, in order either to report information to or receive information from other vehicles, from the infrastructure and/or with people outside of said vehicle 101.

The control members of the vehicle 101 are able to monitor, control or regulate:
  the longitudinal, transverse and/or vertical dynamics of said vehicle 101 (for example, these members may be brakes, steering, suspensions, the engine, etc.);
  the comfort and safety of the vehicle 101.

Communication channels 108 and 109 partly illustrate the communications and exchanges of information on an information network of the wired type, such as CAN, FlexRay, Ethernet, etc. networks, of the optical type, or of the radiofrequency type such as wifi, 4G, 5G, etc. These communication channels allow information exchanges between the device 107 and the other members (seat 102, safety belt, steering wheel 103, dashboard 104, multi-media system, lights, screens, air conditioning/ventilation, steering assistance members 105, members 106 capable of driving the vehicle 101 and any device 107 participating in the implementation of the method).

Figure 2:
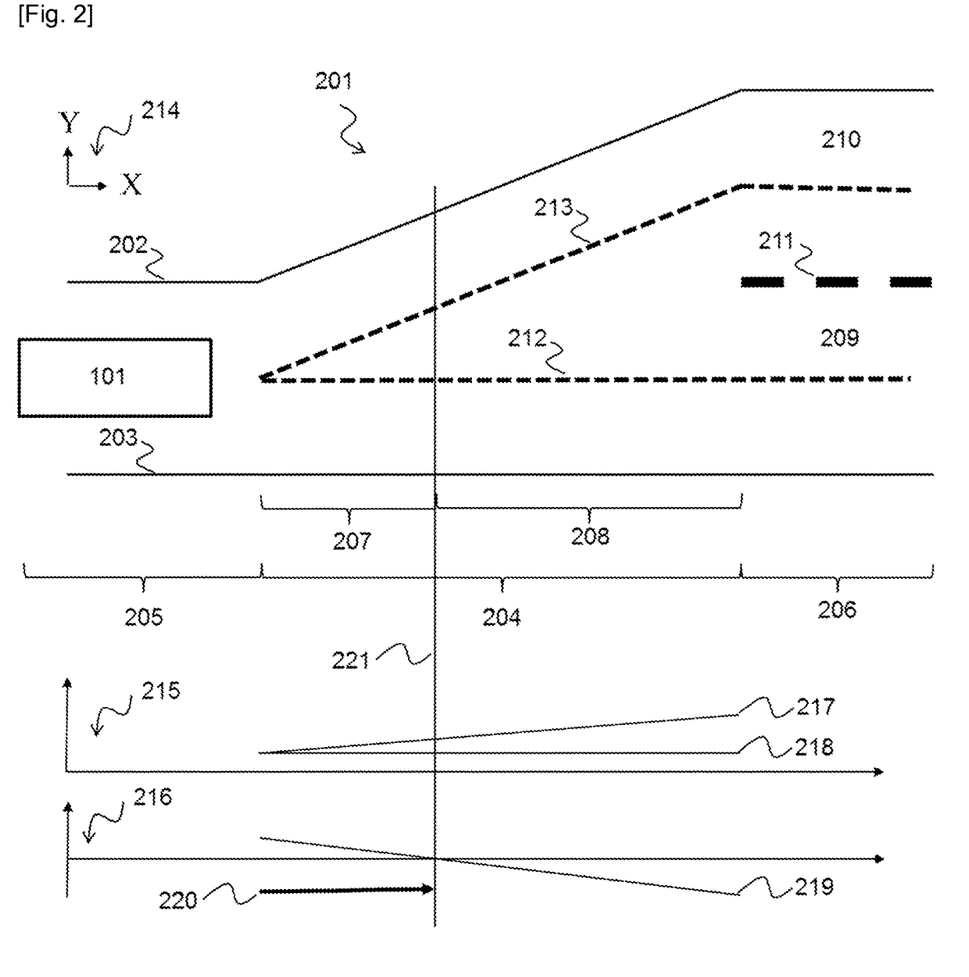
FIG. 2 schematically shows the reference paths of a widened area of a traffic lane.

FIG. 2 shows the vehicle 101 traveling in a traffic lane 201 bounded by two edges, a left edge 202 and a right edge 203.

The traffic lane 201 is split into several areas. A first area 204 corresponds to the widened area of the traffic lane. An upstream area 205 corresponds to the area of the traffic lane upstream of the widened area 204. The travel lane upstream of the widened area 204 is also called the initial lane. A downstream area 206 corresponds to the area of the traffic lane downstream of the widened area 204. The beginning of the widened area 204 corresponds to the end of the upstream area 205. The end of the widened area 204 corresponds to the beginning of the downstream area.

The widened area 204 is partitioned into two sub-areas, a first sub-area 207 and a second sub-area 208. FIG. 2 shows a partitioning line that separates the first sub-area 207 from the second sub-area 208.

The area 206 downstream of the widened area 204 is divided into two lanes, an ego-lane 209 and an adjacent lane 210. The line 211 represents a marking on the ground separating the ego-lane 209 from the adjacent lane 210.

FIG. 2 also shows the reference path 212 to reach the ego-lane, and the reference path 213 to reach the adjacent lane.

FIG. 2 shows three marks 214, 215, 216. The reference 214 gives a longitudinal and transverse direction for performing distance calculations.

A result of calculating a first lateral distance 217 between the reference path 213 of the adjacent lane and the right edge 203 of the traffic lane is represented in reference 215. A result of the calculation of a second lateral distance 218 between the reference path of the ego-lane 212 and the right edge 203 of the traffic lane is also represented in the reference mark 215.

In reference mark 216, a segment 219 represents the result of a function of the first lateral distance 217 and the second lateral distance 218. By way of illustration, this function is the sum of the second lateral distance 218, of a half-width of the initial lane, and of the opposite (reverse sign) of the first lateral distance 217. The length of a vector 220 represents the calculation of the longitudinal distance relative to the beginning of said widened area. A line 211 shows the longitudinal distance plotted on the widened area 204.

The first sub-area 207, belonging to the widened area 204, is thus bordered transversely by the edges 202 and 203, and is bordered longitudinally by the beginning of the widened area 204 and the line 211.

In FIG. 2, the reference path used by the lateral positioning aid before the widened area is not represented.

Figure 3:
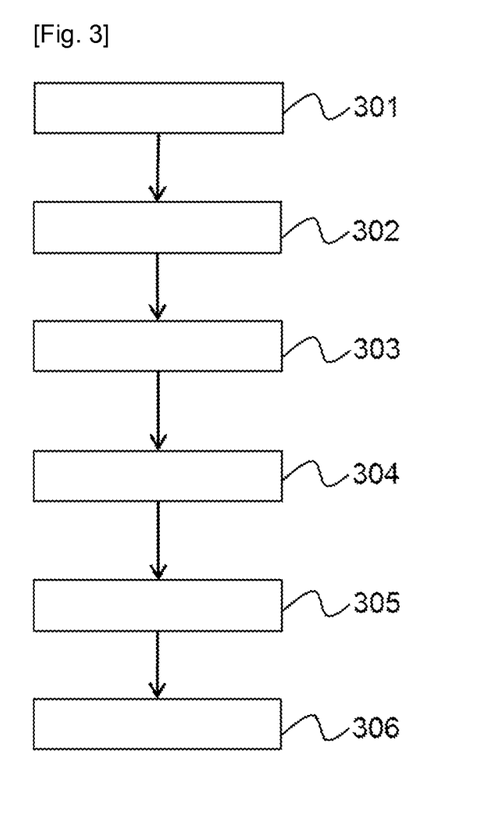
FIG. 3 schematically shows a method for assisting with the lateral positioning of a vehicle.

FIG. 3 schematically shows a method for assisting in the lateral positioning of a vehicle 101. A vehicle 101 capable of being driven by a driver in an automated manner along a reference path travels on said travel path, said travel path being bounded by two edges 202, 203.

Step 301 detects an upcoming split of the traffic lane into at least two new additional lanes, including an ego-lane 209 and an adjacent lane 210.

Advantageously, the detection is carried out on the basis of the environmental perception means. In one embodiment, the processing of images acquired by a camera makes it possible to identify, recognize and locate the marking on the ground. The width of lane in which the vehicle travels over a horizon is determined. The monitoring of the variation in the width of the lane is a division indicator of the lane. Also, monitoring the marking on the ground makes it possible to identify a splitting of the lane with the appearance of an additional marking.

Advantageously, the combination of measurements coming from different means for perceiving the environment and location means (GPS associated with mapping for example) makes detection more robust.

Step 302 determines the widened area 204 of the traffic lane 201. Advantageously, with the marking identification on the ground and the edges of the lane and with the monitoring of the width of the lane, the widened area 204 is determined. In one embodiment, this determination is consolidated and finalized while the vehicle is in the widened area. This determination is updated while the vehicle is in the widened area 204 when new elements are detected such as a new marking indicating the splitting of the lanes created by the broadening of the lane. In another embodiment, the widened area 204 is entirely determined from the beginning of the entry of this area using the location device associated with maps, or geometric data, of the lane.

Step 303 determines, in said widened area 204, reference paths 212, 213 capable of reaching each new lane 209, 210. In one embodiment, a reference path 212 is determined to reach the ego-lane 209, and another reference path 213 is determined to reach the adjacent lane 210. The term "ego-lane" is understood to mean the preferential or default lane of the lateral positioning aid during a lane split. Generally, it is the right-hand lane in the event of right-hand traffic or the left-hand lane in the event of a left-hand traffic. The adjacent lane is the lane next to the ego-lane.

According to one embodiment, a reference path 212, 213 in the widened area 204 leading to one of the lanes 209, 210 derived from the division of the current lane may be created as the shortest path between the reference path of the lane just before the widened area and the reference path of the new lane after the widened area.

According to another embodiment, the reference path is the shortest path which respects the curvature of the road and/or the trajectory planning criteria (shorter distance, lower acceleration, lower consumption, etc.).

According to another embodiment, a first reference path is determined from the right edge of the traffic lane. By way of illustration, this determination may correspond to a transverse variance of a half-width of the initial lane relative to the edge of the traffic lane. If the width of the lane furthest to the right among the new lanes created at the end of the widened area is identical to the width of the initial lane, the first reference path connects the center of the initial lane to the center of the rightmost lane among the new lanes created at the end of the widened area while respecting the curvature of the road.

According to another embodiment, a second reference path is determined from the left edge of the traffic lane. By way of illustration, this determination may correspond to a variance of a half-width of the initial lane relative to the left edge of the traffic lane. If the width of the leftmost lane among the new lanes created at the end of the widened area is identical to the width of the initial lane, the second reference path connects the center of the initial lane to the center of the leftmost lane among the new lanes created at the end of the widened area while respecting the curvature of the road.

According to another embodiment, the reference path to reach the ego-lane 209 is a function of the edge closest to the ego-lane. In particular, the reference path to reach the ego-lane 209 is a fixed distance, for example the width of a half-lane, relative to the right-hand lane in the event of right-hand traffic and the left-hand lane in the event of left-hand traffic.

According to another embodiment, the reference path to reach the adjacent lane 210 is a function of the edge closest to the adjacent lane. In particular, the reference path to reach the adjacent lane 210 is a fixed distance, for example the width of a half-lane, relative to the left-hand lane in the event of a right-hand traffic and the right-hand lane in the event of a left-hand traffic.

Step 304 determines a first 207 and a second sub-area 208 of said widened area as a function of reference paths 202, 203.

According to one embodiment, this determination is a function of the variance (transverse difference) between the reference path in order to reach the ego-lane 212 and the reference path of the ego-lane 212.

According to another embodiment, the method comprises a step of calculating a longitudinal distance relative to the beginning of said widened area, said longitudinal distance being a function of the reference paths 212, 213 and of the edges 202, 203.

In one embodiment, one of the edges 202, 203 of the traffic lane is selected, for example edge 202. A first lateral distance 217 is calculated from a first reference path and from the selected edge 202, this corresponds to the lateral variance between the first reference path and the selected edge 202. A second lateral distance 218 is calculated from the second reference path 213 and the selected edge 202. This corresponds to the lateral variance between the second reference path 213 and the selected edge 202. In this particular embodiment, shown in FIG. 2, the longitudinal distance is defined when the difference between the second lateral distance 218 and the first lateral distance 217, and increased by an offset such as the width of the initial lane, becomes negative.

Advantageously, this longitudinal distance is a function of the geometry of the vehicle, and in particular on the width of the vehicle. The longitudinal distance may be greater for a wider vehicle. A wider vehicle in the widened area 204 leaves less space to be passed.

Advantageously, this longitudinal distance is a function of on the geometry of the traffic lane. For example, in the event of a non-constant variation in the traffic lane, the longitudinal distance will have to be adapted or even reduced to zero.

Advantageously, this longitudinal distance is a function of a margin, an offset and/or at least a predetermined value. In one particular case, the longitudinal distance is defined when the difference between the first lateral distance 217 and the second lateral distance 218 exceeds a threshold. This takes into account uncertainties in the measurements used for the detection, determination and calculation steps of the method. In another embodiment, depending on the predetermined value, the method is more or less reactive.

Advantageously, this longitudinal distance is a function of the speed (position, acceleration and/or jerk) of the vehicle. In particular, a change in driving assistance in the first sub-area will be felt more by the driver, and may give an impression of discomfort or lack of safety.

Advantageously, this longitudinal distance depends on the travel conditions. In particular, during heavy traffic, it is preferable to reduce the first sub-area 207.

According to another embodiment, the method comprises a step which determines a first sub-area 207 of the widened area 204 between the beginning of the widened area 204 and said longitudinal distance. The determination of the second sub-area 208 corresponds to the complement of the first sub-area 207 relative to the widened area 204. Advantageously, the sub-area 207 is the first longitudinal part of the widened area.

When the vehicle 101 is in the first sub-area 207, step 305 selects a first reference path from the determined reference paths, the selection being made from information acquired by at least one sensor of the vehicle 101. When the vehicle 101 is in the first sub-area 207, at least two reference paths were determined: the reference path to reach the ego-lane 212, and the reference path to reach the adjacent lane 213. The method is thus able to change reference path, which causes a change in the trajectory that the vehicle will take when the lateral positioning aid is activated.

Advantageously, this step can be activated several times to be able to change the selection of the reference path as a function of new information acquired by at least one sensor of the vehicle 101.

In particular, information acquired by at least one sensor of said vehicle is the activated side of the turn signal, another vehicle in front of and traveling more slowly than said vehicle, a speed of said vehicle lower than a setpoint of the vehicle, and/or the lateral position of said vehicle in the widened area of said traffic lane. Thus, the lateral positioning of the vehicle will be different at the end of the first area 207, without any noticeable action (such as a steering wheel angle, a steering wheel rotation speed, and/or a measured steering wheel torque below a threshold) on the steering wheel by the driver.

When the vehicle 101 is in the second sub-area 208, step 306 selects a second reference path from the determined reference paths 212, 213, the selection is made only from at least one action on the steering wheel by the driver. In particular, changing the lateral positioning in the second sub-area 208 to follow a different reference path without action of the driver is awkward (sudden transition) and risky (not taking into account the traffic coming behind or already present next to the vehicle). The driver must take control of the lateral positioning of the vehicle by substantially exerting a torque on the steering wheel and/or a rotation of the steering wheel.

Advantageously, this step can be activated several times to be able to change the selection of the reference path as a function of new actions on the steering wheel by the driver.

Figure 4:
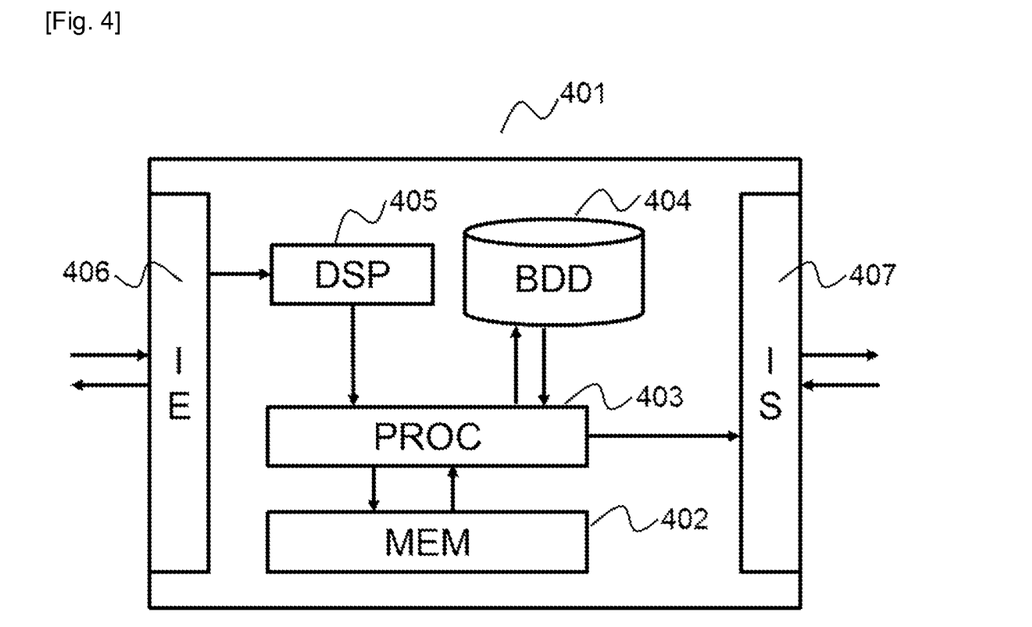
FIG. 4 schematically shows a computer which can carry out the method.

FIG. 4 represents an example of a device 401, such as a computer 107. This device 401 can be used as a device capable of implementing the steps of the method. This device 401 can take the form of a housing comprising printed circuits, any type of computer or else a mobile telephone.

The device 401 comprises a random access memory (MEM) 402 for storing instructions for the implementation by a processor (PROC) 403 of the supervision method as described above. The device 401 also comprises a mass storage (BDD) 404 for storing data intended to be kept after the implementation of the method.

The device 401 may further comprise a digital signal processor (DSP) 405. This DSP 405 receives digital signals relating to data for shaping, demodulating and amplifying these data in a manner known per se.

The device 401 also comprises an input interface 406 for receiving the data read by the sensors from the steering wheel 103, the dashboard 104, the steering assistance system 105, the members 106 able to drive the vehicle 101 in an automated manner according to a reference path on a traffic lane 201, and/or the device 107 which comprises environmental perception, human-machine interface, and control of the vehicle 101 members.

The device 401 comprises an output interface 407 for the transmission of the data and information calculated and/or transformed by the method.

The claimed invention is not limited to the embodiments described above by way of example; it extends to other variants. In particular, it is adapted in the case of splitting of more than two lanes such as, for example, at the arrival of a highway toll area.

The invention claimed is:

1. A method for assisting with the lateral positioning of a vehicle, said vehicle being able to be driven by a driver in an automated manner along a reference path in a traffic lane, said traffic lane being bounded by two edges, said vehicle comprising a steering wheel and a control system, the control system comprising:
   a computer,
   a steering assistance device in communication with the computer, the steering assistance device being adapted to detect an action by the driver on the steering wheel and to control lateral positioning of said vehicle, and
   a driving assistance device in communication with the computer and said steering assistance device, said driving assistance device being adapted to drive the vehicle in an automated manner, said driving assistance device comprising sensors adapted to perceive an environment around the vehicle, said sensors being adapted to recognize a traffic lane, road edges and ground markings, and objects in the vicinity of the vehicle, said method comprising the steps of:
said control system receiving information from at least one of said sensors regarding a width of the traffic lane;
said control system detecting a widening of the traffic lane from said information as a widened area;
said control system determining if said traffic lane is splitting into at least two new lanes from said information;
said control system determining reference paths through said widened area capable of reaching each new lane;
said control system determining a first sub-area and a second sub-area of said widened area as a function of the reference paths and the edges of said traffic lane;
said first sub-area extending longitudinally from a start of said widened area and said second sub-area extending from an end of said first sub-area to an end of said widened area;
wherein when the vehicle is in the first sub-area, the method further comprises a step of said control system selecting a first reference path from the determined reference paths, the selection being made from information acquired by at least one sensor of said vehicle;
wherein, when the vehicle is in the second sub-area, the method further comprises said control system detecting an action on said steering wheel by said driver and a step of selecting a second reference path from the determined reference paths, the selection being made in response to said action on the steering wheel by the driver; and
wherein the method further comprises a step of said control system driving the vehicle in an automated manner according to the selected reference path.

2. The method for assisting with the lateral positioning of a vehicle according to claim 1, wherein the information acquired by at least one sensor of said vehicle is the side, left or right, of an activation of a turn signal.

3. The method for assisting with the lateral positioning of a vehicle according to claim 1, wherein the information acquired by at least one sensor of said vehicle is the detection of another vehicle in front of and traveling more slowly than said vehicle.

4. The method for assisting with the lateral positioning of a vehicle according to claim 1, wherein the information acquired by at least one sensor of said vehicle is a speed of said vehicle less than or greater than a set speed.

5. The method for assisting with the lateral positioning of a vehicle according to claim 1, wherein the information acquired by at least one sensor of said vehicle is the lateral position of said vehicle in the widened area of said traffic lane.

6. The method for assisting with the lateral positioning of a vehicle according to claim 1, wherein the action on the steering wheel by the driver is a rotation of the steering wheel and/or a rotational torque applied to the steering wheel.

7. The method for assisting with the lateral positioning of a vehicle according to claim 1, wherein the method further comprises the steps of:
said control system calculating a longitudinal distance relative to the beginning of said widened area, said longitudinal distance being a function of the reference paths and the edges of said traffic lane; and
said control system determining the first sub-area of said widened area between the beginning of said widened area and said longitudinal distance, the determination of the second sub-area corresponding to a complement of said first sub-area relative to the widened area.

8. A control system for assisting the lateral positioning of a vehicle, comprising a memory associated with at least one processor configured to implement the method according to claim 1.

9. A vehicle comprising the control system for assisting the lateral positioning of a vehicle according to claim 8.

10. A computer program product comprising a memory storage device comprising computer executable instructions stored thereon suitable for executing the steps of the method for assisting with the lateral positioning of a vehicle according to claim 1 when said instructions are executed by at least one processor of a control system of said vehicle.

11. The method for assisting with the lateral positioning of a vehicle according to claim 1, wherein the sensors comprise means for perceiving light waves, radio frequency waves, or acoustic waves.

12. A method for assisting the lateral positioning of a vehicle (101), said method being implemented by a device (401), said device driving the vehicle (101) in an automated manner on a traffic lane (201) according to a reference path, said traffic lane being delimited by two edges (202, 203), said method comprising the steps of:
said device receiving input from at least one sensor being adapted to recognize a traffic lane, road edges and ground markings;
said device detecting (301), based on information received from said at least one sensor, an upcoming division of said traffic lane into at least two new lanes (209,210);
said device determining (302) based on said information an expansion zone (204) of said traffic lane;
said device determining (303) reference paths (212, 213) through said expansion zone capable of reaching each new lane (209, 210);
said device calculating a longitudinal distance relative to a beginning of said expansion zone (204), said longitudinal distance being a function of the determined reference paths (212, 213) and the edges (202, 203) of said traffic lane;
said device determining (304) a first (207) and a second sub-zone (208) of said expansion zone based on the determined reference paths (212, 213) and the edges (202, 203) of said traffic lane;
the first sub-zone (207) of said expansion zone (204) being between the beginning of said expansion zone and said longitudinal distance, the second sub-zone (208) corresponding to a complement of said first sub-zone (207) relative to the expansion zone (204);
wherein when the vehicle (101) is in the first sub-zone, the method comprises a step (305) of selecting a first reference path among the determined reference paths (212, 213), the selection being made based on information acquired by at least one sensor of said vehicle, and said device controlling said vehicle to drive said vehicle through said expansion zone along said selected first reference path; and
when the vehicle (101) is in the second sub-zone (208), the method comprises a step (306) of selecting a second reference path among the determined reference paths (212, 213), the selection being made solely based on at least one action on the steering wheel by the driver, and said device controlling said vehicle to drive said vehicle through said expansion zone along said selected second reference path.

* * * * *